Jan. 11, 1966 D. H. RAKULA 3,229,134
THERMAL VARIATION COMPENSATION MEANS AND METHOD
Filed Jan. 25, 1962 2 Sheets-Sheet 1

INVENTOR.
DIERK H. RAKULA
BY
John F. A. Earley
ATTORNEY

INVENTOR.
DIERK H. RAKULA
BY John F. A. Earley
ATTORNEY

United States Patent Office 3,229,134
Patented Jan. 11, 1966

3,229,134
THERMAL VARIATION COMPENSATION MEANS
AND METHOD
Dierk H. Rakula, Hatboro, Pa., assignor, by mesne assignments, to Litton Industries Inc., Beverly Hills, Calif., a corporation of Delaware
Filed Jan. 25, 1962, Ser. No. 168,768
17 Claims. (Cl. 310—216)

This invention relates to improvements in thermal variation means and method, and more particularly concerns the controlling of stresses caused by change in temperature when two metals with different coefficients of thermal expansion are caused to coact in expanding or contracting. Further, this invention relates to a synchro, or the like, having a stack of laminations, and a casing positioned adjacent the stack of laminations and made of a material having a higher coefficient of thermal expansion than the material of said lamination stack.

This invention is especially applicable to electrical devices such as synchros where a change in dimensions caused by temperature variations also changes the electrical characteristics of the device.

For example, in a rotary component such as a conventional synchro, for many practical reasons the casing is made of aluminum and the stator is made of a stack of nickel-iron alloy laminations. However, these two metals have widely different coefficients of thermal expansion (aluminum has more than twice the coefficient of the nickel-iron alloy).

One form of conventional synchro is made in the following manner. The aluminum housing is formed so that its inside diameter is slightly larger than the outside diameter of the nickel-iron stator stack. The two parts are assembled into a unit by coating the stator with an epoxy resin, slipping the epoxy-coated stator stack into the housing, and heating the assembled unit at 150° C. for six hours until the epoxy resin cures.

Since the cylindrical housing is aluminum, when heated it expands and increases its diameter to a greater extent than does the nickel-iron stator. Therefore, the gap between the two parts begins to widen as soon as the temperature is increased above normal room temperature. At 150° C., the liquid epoxy resin fills the enlarged gap and hardens in place while the gap between the housing and stator stack is the widest.

When the temperature is reduced to normal room temperature, the housing tends to contract at a higher rate than the stator, but is prevented from doing so by the slower contracting stator. Accordingly, the housing presses on the stator stack and sets up stresses in it. Such stresses on the stator change its electrical characteristics.

Adjustments may be made on the synchro to obtain the desired electrical characteristics, but such adjustments hold only for the particular temperature at which they are made. Thereafter, any change in temperature changes the electrical characteristics. An increase in temperature causes the housing to expand and thus relax its pressure on the stator, and a decrease in temperature causes the housing to contract at a faster rate than the stator and thus increase its pressure on the stator. Accordingly, uniform electrical response cannot be expected when a synchro is made in such a manner. The usual working, or service, temperature for synchros is in the range of from —55 to plus 125° C.

Temperature variations also cause changes in electrical characteristics in pancake type synchros in which the nickel-iron rotor stack is fixed to an aluminum hub. However, here the stresses on the rotor stack increase with increasing temperature, and decrease with falling temperature. The hub tends to separate from the rotor stack as the temperature decreases.

Accordingly, it is an object of this invention to solve the problems and overcome the disadvantages referred to hereinbefore.

It is another object of this invention to provide thermal variation compensation means and method by which two metals having dissimilar thermal coefficients of expansion are caused to expand and contract together when subjected to temperature variations.

It is another object of this invention to provide a synchro, or the like, having a lamination stack and a casing which expand and contract together in response to temperature variations and prevent the casing from changing the mechanical stresses and electrical characteristics of said stack.

It is another object of this invention to provide a device made of at least two rings, or the like, which rings expand and contract together in a uniform manner in response to temperature variations over a desired temperature range, and to provide a method for making such a device.

It is another object of this invention to provide a housing made of two rings having different thermal coefficients of expansion, the combined thermal coefficient of expansion being equal to the thermal coefficient of expansion of a third ring.

Other objects and advantages of this invention, including its simplicity and economy, will further become apparent hereinafter and in the drawings, in which.

Figure 1:
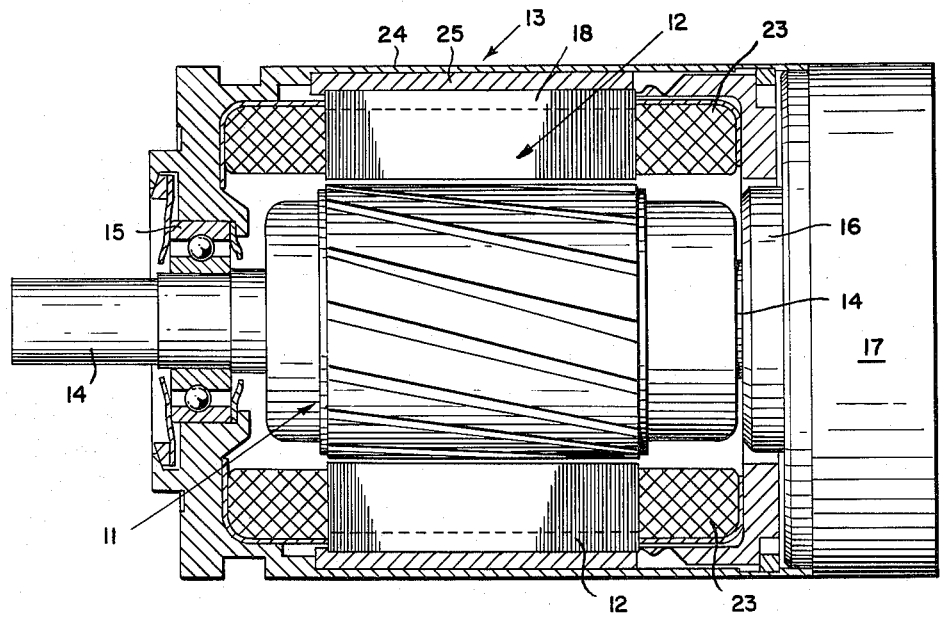
FIG. 1 is a view in longitudinal section of a synchro constructed in accordance with this invention.

Although specific terms are used in the following description for clarity, these terms are intended to refer only to the structure shown in the drawings and are not intended to define or limit the scope of the invention.

Figure 2:
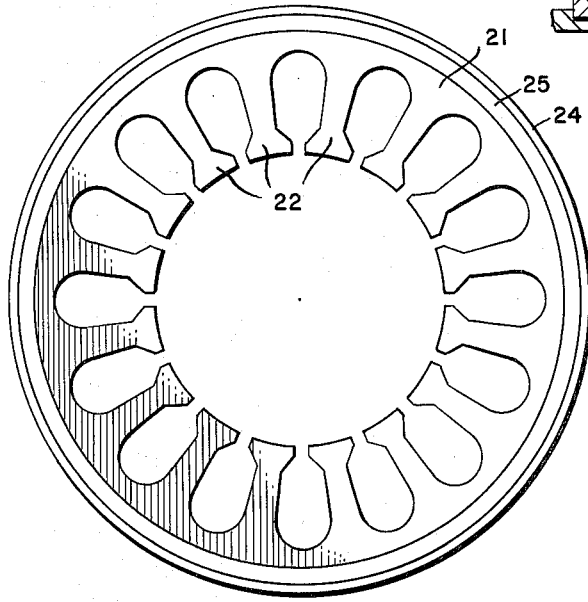
FIG. 2 is a view in front elevation of one of the laminations of the stator in FIG. 1.

Turning now to the embodiments of the invention selected for illustration in the drawings, there is shown, in FIGS. 1 and 2, a synchro having a rotor 11 rotatably positioned within a stator 12 which is supported and positioned within a housing 13.

Rotor 11 is provided with a shaft 14 havng one end supported in a bearing 15 of housing 13, and the other end supported in a bearing housing 16 which is located adjacent to a commutator brush cage 17.

Stator 12 includes a stack 18 of nickel-iron laminations 21 preferably made of a high permeability unorientated forty-nine percent nickel-iron alloy, which is ring-like in shape and is provided with a plurality of teeth 22, and a stator winding 23.

Housing 13 includes a cup-like outer casing 24, which is made of aluminum, and a buffer sleeve 25 positioned between casing 24 and stator 12 and in contact therewith.

Buffer sleeve 25 has a lower thermal coefficient of expansion than either casing 24 or the laminations 21 of stator 12.

At room temperature, or any temperature within the working range of the synchro, when unassembled the inside diameter of buffer sleeve 25 is larger than the outside diameter of stator laminations 21.

Also, when unassembled at room temperature, or any temperature within the working range of the synchro, the outside diameter of buffer sleeve 25 is larger than the inside diameter of casing 24.

The sizes and dimensions of the elements are so proportioned that the internal diameter of casing 24 and the outer diameter of buffer sleeve 25 are identical when heated to about 160° C. Therefore, to assemble the elements, casing 24 is heated to about 200° C. to increase its inside diameter sufficiently so that buffer sleeve 25 (which is heated to 160° C.) slips freely into the casing 24. At the temperature is decreased, the internal diameter of casing 24 decreases and contacts the outer diameter of buffer sleeve 25 at about 160° C. From this temperature downward toward room temperature, casing 24 grips buffer sleeve 25 tighter and tighter until at room temperature the internal diameter of buffer sleeve 25 is no longer what it was before at room temperature but is reduced in size. The internal diameter of buffer sleeve 25 has been reduced, not according to the thermal expansion coefficient of the material of buffer sleeve 25, and not according to the thermal coefficient of expansion of the material of casing 24, but according to the thermal coefficient of expansion of housing 13 (the combined casing 24 and buffer sleeve 25) which is equal to the thermal coefficient of expansion of the stator laminations 21.

It should be noted that the internal diameter of housing 13 is less than the internal diameter of buffer sleeve 25 before sleeve 25 was inserted into outer casing 24 and shrunk fit by the contractions of casing 24.

Accordingly, it may be seen that, since aluminum casing 24 was shrunk onto buffer sleeve 25 at a temperature above the normal upper service temperature of the synchro, which is 125° C., aluminum casing 24 is always stressing buffer sleeve 24 during the normal service temperature range of the synchro. In fact, casing 24 begins to stress buffer sleeve 25 at about 160° C., and continues to do so at all values below this temperature, including whatever values below zero that the synchro may encounter in service.

The combination of casing 24 and buffer sleeve 25, when made to proper sizes, produces a thermal expansion and contraction rate similar to that of stator stack 18. The inside diameter of buffer sleeve 25 is normally larger than the outside diameter of stator 12, at the same temperature, absent the compression exertion on buffer sleeve 25 by casing 24. Also, the outside diameter of buffer sleeve 25 is normally larger than the inside diameter of casing 24, at the same temperature, absent the compression exerted on buffer sleeve 25 by casing 24. By this arrangement, buffer sleeve 25 expands together with stator 12, when the temperature rises, because of the decreasing compression from the faster expanding casing 24; and buffer sleeve 25 contracts together with stator 12 when the temperature falls, because of the increased compression from the faster contracting casing 24.

In assembling stator 12 within housing 13, stator 12 (which has an outside diameter which is slightly less than the inside diameter of the housing 13 at room temperature) is coated with an epoxy resin and inserted into housing 13. The assembly is heated for six hours at 150° C. to cure the resin. This temperature of 150° C. does not create any gap between buffer sleeve 25 and outer casing 24 into which the liquid epoxy resin could flow and produce stresses later on, since the juncture between buffer sleeve 25 and outer casing 24 was shrunk fit at 160° C., which is 10° C. above the 150° C. epoxy resin curing temperature. Also, no gap opens between stator 12 and housing 13, since both now expand and contract together at the same rate.

Figure 3:
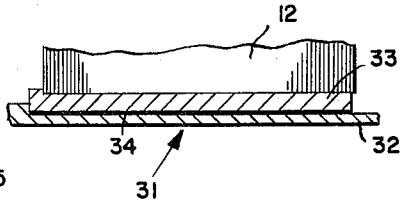
FIG. 3 is a partial view similar to FIG. 1 of another embodiment of the invention and illustrates a binder layer.

In the embodiment of the invention shown in FIG. 3, there is shown a stator 12 whch is positioned within a housing 31 having an outer casing 32 positioned adjacent the stator stack and made of a material, such as aluminum, having a higher thermal coefficient of expansion than the material of the stator stack laminations, a buffer sleeve 33 positioned between the stator 12 and casing 32 and having a lower thermal coefficient of expansion than either, and a binder layer 34 joining buffer sleeve 33 to casing 32, whereby buffer sleeve 33 is caused by the faster expanding casing 32 and the pull from binder layer 34 to expand together with stator 12, and whereby buffer sleeve 33 is caused by the faster contracting casing 32 to contract with stator 12, so that no changes in mechanical stress and electrical characteristics are set up in stator 12.

In the embodiment of the invention of FIG. 3, the elements of the stator 12, buffer sleeve 33, and casing 32 may be of such a size as to fit together without exerting stress on each other at normal room temperature. The thermal coefficient of expansion of buffer sleeve 33 is lower than the thermal coefficient of expansion of stator 12, and the thermal coefficient of expansion of casing 32 is higher than that of stator 12. Accordingly, when the temperature decreases, buffer sleeve 33 contracts together with stator 12 at the same rate, which is faster than the contraction rate of its thermal coefficient of expansion, because of the increasing force and pressure from the faster contracting casing 32.

When the temperature rises, buffer sleeve 33 expands together with stator 12 at the same rate, which is faster than the expansion rate of its thermal coefficient of expansion, because of the force exerted on buffer sleeve 33 by the faster expanding casing 32. This force is transmitted to buffer sleeve 33 by binder layer 34. Accordingly, because of the action of binder layer 34 in pulling buffer sleeve 33, housing 31 expands and contracts together with stator 12 at the same rate in response to temperature variations, so that the expansion and contraction of housing 31 does not change the mechanical stress and electrical characteristics of stator 12.

Figure 4:
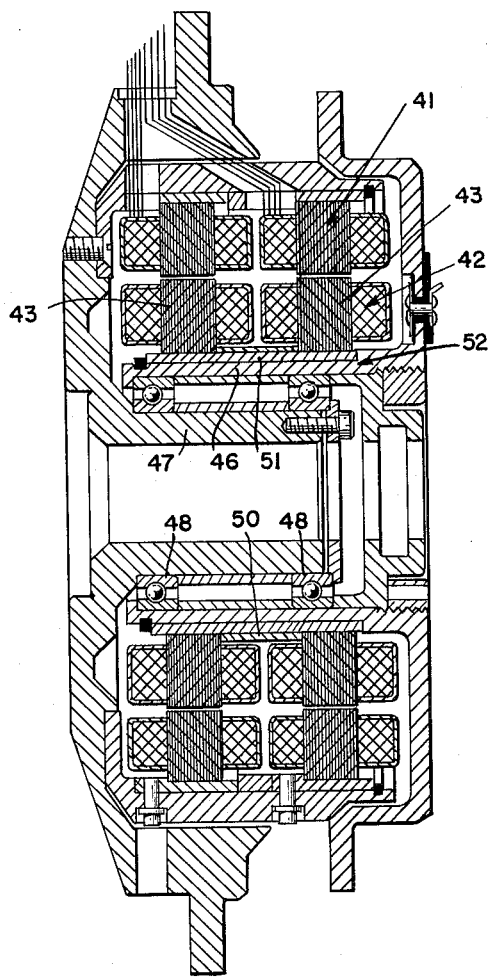
FIG. 4 is a view in longitudinal section of a pancake type synchro constructed in accordance with this invention.
Figure 5:
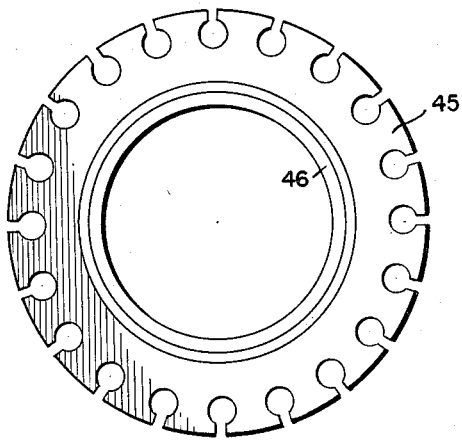
FIG. 5 is a view in front elevation of a lamination of the rotor in FIG. 4.

In the embodiment of the invention shown in FIGS. 4 and 5, there is shown a pancake type synchro, in this case, a dual resolver, which has a stator 41, and a rotor 42 mounted therein having two stacks 43 of nickel-iron laminations 45.

Rotor stacks 43 are mounted on an aluminum rotor hub 46 which is rotatably supported on stator hub 47 by bearings 48.

Rotor hub 46 is made of a material having a higher thermal coefficient of expansion than the nickel-iron material of the rotor stacks 43. A buffer sleeve 51 is positioned between rotor stacks 43 and rotor hub 46 and in contact therewith. Buffer sleeve 51 has a lower thermal coefficient of expansion than stacks 43 and rotor hub 46. A spacer ring 50 separates stacks 43 and has a thermal expansion coefficient similar to that of the stacks. Spacer ring 50 is not used for expansion correction.

The outside diameter of buffer sleeve 51 is smaller than the inside diameter of rotor stacks 43 at room temperature when the elements are unassembled.

The inside diameter of buffer sleeve 51 is smaller than the outside diameter of rotor hub 46 at room temperature when the elements are unassembled. Buffer sleeve 51 is mounted on rotor hub 46 by chilling rotor hub 46 so that it contracts sufficiently so that buffer sleeve 51 (which is at room temperature) may be slipped over it. The chilling temperature used in assembly is below the lowest service temperature of the synchro.

Accordingly, rotor hub 46 always exerts a force on buffer sleeve 51 at any temperature within the desired service temperature range of the synchro, and buffer sleeve 51 does not expand and contract according to its own thermal coefficient of expansion, but expands and contracts according to its thermal coefficient as modified by the stress on buffer sleeve 51 exerted by rotor hub 46. The resulting shrinkage or expansion of buffer sleeve 51 is similar to that of rotor stacks 43 which are made of a nickel-iron alloy so that housing 52, which includes buffer sleeve 51 and rotor hub 46, expands and contracts together with rotor stacks 43 in response to temperature variations over the operating range of the synchro. Accordingly, the expansion and contraction of housing 52 do not change the mechanical stress and electrical characteristics of rotor stacks 43.

Figure 6:
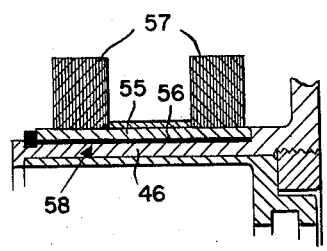
FIG. 6 is a partial view similar to FIG. 4 showing an alternative embodiment of the invention, having a binder layer.

The embodiment of the invention disclosed in FIG. 6 includes rotor hub 46, a buffer sleeve 55, and a binder layer 56 (preferably an epoxy resin) which joins buffer sleeve 55, to rotor hub 46. The elements in FIG. 6 are of such size that they may be assembled at room temperature. Also provided are rotor stacks 57 made of nickel-iron laminations. After assembly, housing 58 (which comprises hub 46, binder layer 56 and buffer sleeve 55) and stacks 57 expand and contract together in response to variations in temperature. When the temperature rises, buffer sleeve 55 expands faster than its normal thermal coefficient of expansion rate because of the force exerted on it by the faster expanding rotor hub 46.

When the temperature decreases, buffer sleeve 55 contracts at a faster rate than is normal for its thermal coefficient of expansion because of the force exerted on it by binder layer 56 from the faster contracting hub 46.

The embodiments of FIGS. 1, 2, 4 and 5 show the aluminum casing shrunk onto the buffer sleeve so as to exert pressure on the buffer sleeve at all temperatures within the operating or service range of the synchro.

The modification of FIGS. 3 and 6 affixes the aluminum casing to the buffer sleeve in such a manner that the bond between the elements does not break or separate at any temperature over the service range of the synchro. This bonding may be accomplished by using an epoxy resin cement or other bonding material. The resultant product is a bimetal housing which has a casing and a buffer sleeve of dissimilar metals, yet has thermal expansion and contracting properties which are the same as the stack of laminations.

Satisfactory results have been obtained where the nickel-iron laminations have been made of a high permeability unoriented forty-nine percent nickel-iron alloy which has a saturation flux density of approximately 16,000 gauss after hydrogen annealing. A typical analysis (by weight) of the preferable material is: carbon 0.05 percent, manganese 0.50 percent, silicon 0.35 percent, nickel 49.0 percent, and the balance of iron, with a thermal expansion coefficient of $5.8 \times 10^{-6}$ in./in./° C. in the range of from $-70$ to $200°$ C.

A typical analysis of a preferable material used for the buffer sleeves is: carbon 0.12 percent max., manganese 1.00 percent max., silicon 0.35 percent max., nickel and cobalt 36.0 percent, and the balance of iron, with a thermal coefficient of expansion of $1.6 \times 10^{-6}$ in./in./° C. in the range of from $-18$ to $175°$ C. with a modulus of elasticity of $21 \times 10^6$ p.s.i.

If desired, the buffer sleeves may contain 0.20 percent selenium for better machining.

The outer casings are preferably made of 2024 aluminum alloy having a typical analysis of: copper 3.8–4.9 percent, silicon 0.50 percent, iron 0.50 percent, manganese 0.3–0.9 percent, magnesium 1.2–1.8 percent, zinc 0.10 percent, chromium 0.10 percent and the balance of aluminum, with a thermal expansion coefficient of $23.2 \times 10^{-6}$ in./in./° C. and modulus of elasticity of $10.6 \times 10^6$ p.s.i.

EXAMPLE

The following specific example illustrates the invention.

Stator stack 18 is made of nickel-iron laminations 21 having a coefficient of thermal expansion of $5.8 \times 10^{-6}$ in./in./° C., and has an outer diameter of 0.8750 inch.

It is desired to provide a housing 13 having a thermal coefficient of expansion equal to that of stator stack 18 ($5.8 \times 10^{-6}$ in./in./° C.), and a maximum outer diameter of 1.06525 inches.

Outer casing 24 is made of 2024T aluminum alloy having a coefficient of thermal expansion of $23.2 \times 10^{-6}$ in./in./° C., and a modulus of elasticity of $10.6 \times 10^6$ p.s.i.

Buffer sleeve 25 is made of the preferred material hereinbefore described having a coefficient of thermal expansion of $1.6 \times 10^{-6}$ in./in./° C., and a modulus of elasticity of $21.0 \times 10^6$ p.s.i.

The total available wall thickness for buffer sleeve 25 and outer casing 24 is one-half the difference between the outer diameter of casing 24 and the outer diameter of stator stack 18, or ½ (1.0625−0.8750), which equals .09375 inch.

Therefore, letting:

$n$ = wall thickness
$L$ = thermal coefficient of expansion in in./in./° C.
$E$ = modulus of elasticity in p.s.i.
$c$ = outer casing 24
$b$ = buffer sleeve 25
$h$ = housing 13
$s$ = stator 12
$t$ = temperature in degrees C.
$\Delta t$ = change in temperature
I.D. = internal diameter
O.D. = outer diameter
$R$ = room temperature, 25° C.

A. $n_c + n_b = \frac{1}{2}(O.D._h - O.D._s)$
$= \frac{1}{2}(1.0625 - 0.8750)$
$= \frac{1}{2} \times .1875$
$= .09375$ inch I. It is desired that $$L_h = L_s$$

II. $$L_h = \frac{L_c n_c E_c + L_b n_b E_b}{n_c E_c + n_b E_b}$$

within perhaps a half of one percent error, closer than the tolerances of the material.

Also, with all materials fixed, a modification of Equations I and II gives a direct wall-thickness ratio, as follows:

III. $$\frac{n_c}{n_b} = \frac{E_b}{E_c} \times \frac{L_s - L_b}{L_c - L_s}$$

This is an approximate formula which gives close results over normal temperature ranges for synchro service ($-55$ to $125°$ C.) provided the materials used have a linear coefficient of expansion throughout the desired temperature range.

$$\frac{n_c}{n_b} = \frac{10.6 \times 10^6}{21.0 \times 10^6} \times \frac{5.8 \times 10^{-6} - 23.2 \times 10^{-6}}{1.6 \times 10^{-6} - 5.8 \times 10^{-6}}$$

$$= \frac{10.6}{21} \times \frac{(-17.4)}{(-4.2)}$$

$$= \frac{10.6 \times 17.4}{21 \times 4.2}$$

$$= 2.095$$

B. Or $$n_c = 2.095 n_b$$

From A and B, above:

$$n_c + n_b = .09375 \text{ inch}$$
$$n_c = 2.095 n_b$$

substituting:

$$2.095 n_b + n_b = .09375 \text{ inch}$$
$$n_b = \frac{.09375}{3.095} = .0303 \text{ inch}$$

and $$n_c = .09375 - n_b$$
$$= .09375 - .0303$$
$$= .06345$$

Wall thicknesses of buffer sleeve 25 and outer casing 24 being determined, the next step is to compute their inner and outer diameters at room temperature in unassembled condition, so that they may be manufactured to the proper size.

The I.D. of housing 13 must fit over the O.D. of stator stack 18 at room temperature, which is assumed to be 25° C. for the purpose of this example. The required I.D. of housing 13 is 0.8760 inch, allowing .001 inch for clearance, a figure chosen for this example only).

Since the housing 13 expands and contracts with a coefficient of thermal expansion of $L_h = L_s = 5.8 \times 10^{-6}$ in./in./° C., the $I.D._h$ expands to the following value at a temperature of 160° C. (an arbitrary temperature larger than the maximum service temperature of 125° C.):

$$I.D._b{}^{160} = I.D._h{}^R (1 + L_s \Delta t)$$

where $I.D._b{}^{160}$ is the I.D. of the buffer sleeve 25 at 160° C., $I.D._h{}^R$ is the I.D. of housing 13 at room temperature of 25° C., and $\Delta t$ is $160° - 25° = 135°$ $$I.D._b{}^{160} = .8760(1 + 5.8 \times 10^{-6} \times 135)$$
$$= .8760(1 + .00078)$$
$$= .8767$$

At this temperature of 160° C., the O.D. of buffer sleeve 25 is:

$$O.D._b{}^{160} = 2n_b + I.D._b{}^{160} = 2 \times .0630 + .8767$$
$$= 1.0027$$

This $O.D._b{}^{160}$ is equal to the $I.D._c{}^{160}$ of outer casing 24 since buffer sleeve 25 and outer casing 24 are in contact at 160° C. Hence, $I.D._c{}^{160} = O.D._b{}^{160}$.

In order for casing 24 to be assembled on buffer sleeve 25, casing 24 is heated to a higher temperature to obtain clearance between the O.D. of buffer sleeve 25 and the I.D. of casing 24. To provide clearance of .001 inch.

$$I.D._c{}^? = I.D._c{}^{160}(1 + L_c \Delta t)$$

where $I.D._c{}^?$ is the I.D. of casing 24 at some higher temperature.

$$1.0037 = 1.0027(1 + 23.2 \times 10^{-6} \Delta t)$$
$$1.0010 = 1 + 23.2 \times 10^{-6} \Delta t$$
$$23.2 \times \frac{.0010}{10^{-6}} = \Delta t$$
$$\Delta t = \frac{1000}{23.2} = 43.1° \text{ C.}$$

This means casing 24 must be heated to $160° + 43° = 203°$ C. to have a .001 inch total clearance so as to assemble over buffer sleeve 25 easily.

$$(\text{Also } I.D._c = I.D._c{}^{203})$$

From the above figures, working backwards, the dimensions of casing 24 and buffer sleeve 25 at room temperature (the temperature at which they are supplied from the manufacturing operation) are determined as follows:

I.D. of casing 24

$$I.D._c{}^R = I.D._c{}^{203} (1 - L_c \Delta f)$$

where $I.D._c{}^R$ is the I.D. of casing 24 at room temperature of 25° C. and $\Delta t$ is $203° - 25° = 178°$ C.

$$I.D._c{}^R = 1.0037 (1 - 23.2 \times 10^{-6} \times 178)$$
$$= 1.0037 (1 - .00413)$$
$$= 1.0037 \times .99587$$
$$= .9996 \text{ inch}$$

O.D. of buffer sleeve 25

$$O.D._b{}^R = O.D._b{}^{160} (1 - L_b \Delta t)$$

where $\Delta t$ is $160° - 25° = 135°$ $$O.D._b{}^R = 1.0027 (1 - 1.6 \times 10^{-6} \times 135)$$
$$= 1.0027 (1 - .00022)$$
$$= 1.0027 \times .99978$$
$$= 1.0025 \text{ inch}$$

I.D. of buffer sleeve 25

$$I.D._b{}^R = I.D._b{}^{160} (1 - L_b \Delta t)$$
$$= .8767 (1 - 1.6 \times 10^6 \times 135)$$
$$= .8767 \times .99978$$
$$= .8765 \text{ inch}$$

O.D. of casing 24

Also, for machining purposes, the O.D. of casing 24 is determined:

$$O.D._c{}^{160} = I.D._c{}^{160} + 2n_c$$
$$= 1.0027 + 2 \times .030$$
$$= 1.0627 \text{ inches}$$

$$O.D._c{}^R = O.D._c{}^{160} (1 - L_c \Delta t)$$
$$= 1.0627 (1 - 23.2 \times 10^{-6} \times 135)$$
$$= 1.0627 (1 - .00313)$$
$$= 1.0627 \times .9969$$
$$= 1.0594 \text{ inches.}$$

The following table sums up the dimensions of outer casing 24, buffer sleeve 25, housing 13, and stator stack 18:

TABLE I

|  |  | Parts as Manufactured Room Temp. | Parts as Heated for Assembly Purposes | | Assembled Housing at Room Temp. |
| --- | --- | --- | --- | --- | --- |
|  |  |  | 160° C. | 203° C. |  |
| Stator stack 18 O.D. |  | $O.D._s{}^R = .8750$ |  |  |  |
| Buffer Sleeve 25 | I.D. | $I.D._b{}^R = .8765$ | $I.D._b{}^{160} = .8767$ |  | $I.D._b{}^R = .8760$ |
|  | O.D. | $O.D._b{}^R = 1.0025$ | $O.D._b{}^{160} = 1.0027$ |  | $O.D._b{}^R = 1.0020$ |
| Casing 24 | I.D. | $I.D._c{}^R = .9996$ | $I.D._c{}^{160} = 1.0027$ | $I.D._c{}^{203} = 1.0037$ | $I.D._c{}^R = 1.0020$ |
|  | O.D. | $O.D._c{}^R = 1.0594$ | $O.D._c{}^{160} = 1.0627$ | $O.D._c{}^{203} = 1.0637$ | $O.D._h{}^R = 1.0620$ |

It is not necessary to raise the temperature of both the casing 24 and buffer sleeve 25 to assemble them. By keeping the temperature of the buffer sleeve 25 at room temperature, the temperature of casing 24 need only be raised to about 160° C. As shown in Table I, the O.D. of buffer sleeve 25 at room temperature (1.0025 in.) is less than the I.D. of casing 24 at 160° C. (1.0027 in.) the condition needed to insert buffer sleeve 25 into casing 24.

In the case of the pancake design, it is to be noted that the hub can never separate from the buffer sleeve when temperature is increased because the expansion coefficient of the hub is much higher than that of the sleeve.

It is to be understood that the forms of the invention herewith shown and described are to be taken as a presently preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

The claimed invention:

1. A synchro comprising a stack of nickel-iron laminations, a casing positioned adjacent said stack and made of a material having a higher thermal coefficient of expansion than said stack, and means positioned between said stack and casing for causing them to expand and contract together in response to temperature variations to prevent changes in mechanical stress and electrical characteristics in said stack.

2. A synchro comprising a stack of nickel-iron laminations, a casing positioned adjacent said stack and made of a material having a higher thermal coefficient of expansion than said stack, and a buffer sleeve positioned between said stack and casing and having a lower thermal coefficient of expansion than either, said buffer sleeve being of such size that in unassembled condition it would be spaced away from said stack at the same temperature within the working temperature range of said synchro, said casing being of such size that it exerts a force on said sleeve during said temperature range, whereby said buffer sleeve expands and contracts together with said stack in response to temperature variations within said temperature range to prevent variations in mechanical stress on said stack, and thereby avoid resultant changes in electrical characteristics, said buffer sleeve expanding and contracting faster than normal for its thermal coefficient of expansion because of the increasing or decreasing force exerted on said buffer sleeve by the faster expanding and contracting casing.

3. A synchro comprising a stack of nickel-iron laminations, a casing positioned adjacent said stack and made of a material having a higher thermal coefficient of expansion than said stack, a buffer sleeve positioned between said stack and casing and having a lower thermal coefficient of expansion then either, and a binder layer joining said sleeve to said casing so that said sleeve expands and contracts together with said stack so that no changes in mechanical stress and electrical characteristics are set up in said stack.

4. A synchro comprising a stator including a stack of nickel-iron laminations, a cylindrical outer casing made of aluminum positioned around said stator, and a buffer sleeve positioned between said stator and casing and having a lower thermal coefficient of expansion than either.

5. A pancake type synchro comprising a rotor including a stack of nickel-iron laminations, a hub made of aluminum positioned within said rotor, and a buffer sleeve positioned between said rotor and hub and having a lower thermal coefficient of expansion than either.

6. A synchro comprising a stator, a casing positioned around the stator and made of a material having a higher thermal coefficient of expansion than said stator, and a buffer sleeve positioned between and in contact with said casing and stator and having a lower thermal coefficient of expansion than either, the inside diameter of said buffer sleeve being normally larger than the outside diameter of said stator, at the same temperature, absent the compression exerted on said sleeve by said casing, the outside diameter of said buffer sleeve being normally larger than the inside diameter of said casing, at the same temperature, absent the compression exerted on said sleeve by said casing, whereby said sleeve expands together with said stator, when the temperature rises, because of the decreasing compression from the faster expanding casing, and whereby said sleeve contracts together with said stator, when the temperature falls, because of the increasing compression from the faster contracting casing.

7. A pancake type synchro comprising a rotor stack of laminations, a hub positioned within said rotor and made of a material having a higher thermal coefficient of expansion than said rotor stack, and a buffer sleeve positioned between and in contact with said stack and hub and having a lower thermal coefficient of expansion than either, the outside diameter of said buffer sleeve being normally smaller than the inside diameter of said rotor, at the same temperature, absent the force exerted on said buffer sleeve by said hub, the inside diameter of said buffer sleeve being normally smaller than the outside diameter of said hub, at the same temperature, absent the force exerted on said buffer sleeve by said hub, whereby said buffer sleeve expands togther with said rotor, when the temperature rises, because of the increasing force from the faster expanding hub, and whereby said buffer sleeve contracts together with said rotor, when the temperature falls, because of the decreasing force from the faster contracting casing.

8. A thermal variation compensation device made of three rings which expands and contracts in a uniform manner in response to temperature variations over a desired temperature range, comprising a first ring element, a buffer ring element which would normally be spaced away from said first element at the same temperature within said temperature range but is held in contact with said first element by an external force, and a second ring element in contact with and forcing said buffer element against said first element, said second element having a thermal coefficient of expansion higher than that of said first element, said buffer element having a thermal coefficient of expansion which is lower than that of said first and second elements, whereby all elements expand and contract together in response to temperature variations within said desired temperature range, said buffer element expanding and contracting faster than normal for its thermal coefficient of expansion because of the increasing or decreasing force exerted on said buffer element by the faster expanding and contracting second element.

9. A thermal variation compensation device made of at least two rings having different coefficients of thermal expansion, which rings expand and contract together in a uniform manner in response to temperature variations over a desired temperature range, comprising a first ring element, a second ring element positioned adjacent said first ring element, said second element having a higher thermal coefficient of expansion than said first element, and means positioned between said first and second elements for causing them to expand and contract together in response to temperature variations over said desired temperature range.

10. A method of assembling a pancake type synchro comprising taking a buffer sleeve, taking a rotor hub having an outside diameter larger than the inside diameter of the buffer sleeve, chilling said rotor hub below the normal temperature range of the pancake type synchro until its outer diameter is small enough to have said buffer sleeve inserted thereon, inserting said buffer sleeve at room temperature onto said rotor hub, expanding said rotor hub to shrink fit it onto said buffer sleeve, coating a stack of rotor laminations with an epoxy resin, inserting said coated stack onto said buffer sleeve, and heating the assembly to temperature to cure said resin.

11. The method defined in claim 10, wherein the coefficient of thermal expansion of said lamination stack is lower than that of said rotor hub and higher than that of said buffer sleeve.

12. A method of assembling a pancake type synchro comprising taking a buffer sleeve, mounting said buffer sleeve onto a rotor hub having a higher coefficient of expansion than said buffer sleeve, pouring a binder into the space between said sleeve hub to form a binder layer, coating a stack of rotor laminations with a binder, mounting said coated stack onto said buffer sleeve, and heating the assembly to cure the binder, whereby said buffer sleeve, rotor hub, and lamination stack expand and contract together in response to temperature variations.

13. The method defined in claim 12, wherein the coefficient of thermal expansion of said lamination stack is lower than that of said rotor hub and higher than that of said buffer sleeve.

14. A method of assembling a synchro comprising taking a buffer sleeve, taking an outer casing made of an aluminum alloy and having an inner diameter smaller than the outer diameter of the buffer sleeve, heating said outer casing to approximately 200° C. until its inner diameter is large enough to receive said buffer sleeve, inserting said buffer sleeve at room temperature into said heated outer casing, cooling said outer casing to shrink fit it onto said buffer sleeve so that said casing and sleeve make contact at approximately 160° C. to form a bimetal housing, coating a stack of laminations with an epoxy resin, inserting said coated stack into said housing, and heating the assembly for six hours at 150° C. to cure said resin.

15. The method defined in claim 14 wherein the coefficient of thermal expansion of said lamination stack is lower than that of said outer casing and higher than that of said buffer sleeve.

16. A method of assembling a synchro comprising taking a buffer sleeve, taking an outer casing having an inner diameter smaller than the outer diameter of the buffer sleeve, heating said outer casing above the normal temperature range of the synchro until its inner diameter is large enough to receive said buffer sleeve, inserting said buffer sleeve into said outer casing, cooling said outer casing to shrink fit it onto said buffer sleeve so that the combined casing and sleeve form a housing, coating a stack of laminations with an epoxy resin, the coefficient of thermal expansion of said lamination stack being lower than that of said outer casing and higher than that of said buffer sleeve, inserting said coated stack into said housing, and heating the assembly at a temperature below that at which said casing would separate from said sleeve to cure said resin.

17. A method of assembling a synchro comprising taking a buffer sleeve, inserting said buffer sleeve into an outer casing having a higher coefficient of expansion than said buffer sleeve, pouring a binder into the space between said sleeve and casing to form a binder layer, coating a stack of laminations with a binder, the coefficient of thermal expansion of said lamination stack being lower than that of said outer casing and higher than that of said buffer sleeve, inserting said coated stack into said sleeve, and heating the assembly to cure the binder, whereby said buffer sleeve, outer casing, and lamination stack expand and contract together in response to temperature variations.

References Cited by the Examiner
UNITED STATES PATENTS
2,711,008   6/1955   Smith _____ 29—155.61

ORIS L. RADER, *Primary Examiner.*